Aug. 26, 1969 J. L. DODSON 3,463,230
METHOD OF MAKING A RELATIVE PERMEABILITY SURVEY USING
A FLOATING PLUGGING MATERIAL
Filed April 10, 1967
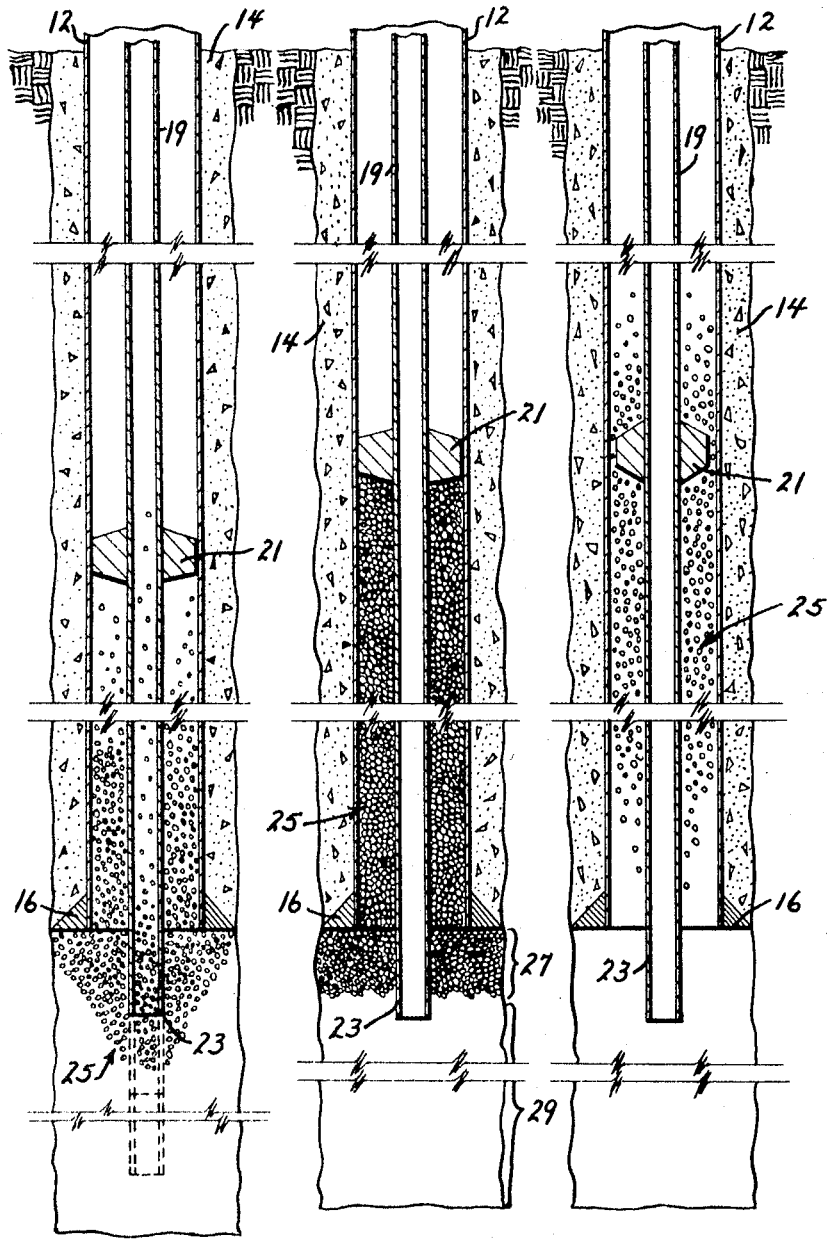
INVENTOR
JAMES L. DODSON
BY
ATTORNEY

United States Patent Office 3,463,230
Patented Aug. 26, 1969

3,463,230
METHOD OF MAKING A RELATIVE PERMEABILITY SURVEY USING A FLOATING PLUGGING MATERIAL
James L. Dodson, 2312 Sunset Lane,
Henderson, Ky. 42420
Filed Apr. 10, 1967, Ser. No. 629,744
Int. Cl. E21b *47/00, 49/00, 33/00*
U.S. Cl. 166—254                                   1 Claim

ABSTRACT OF THE DISCLOSURE

A method of selectively controlling and/or plugging a desired portion of an oil or gas well formation for various end purposes through the introduction of floatable material particles. A relative permeability survey may be conducted by alternatively using such particles to plug an increment of the formation and making an injection test of the unplugged portion.

---

As is known, some of the major problems in the oil and gas industry arise in the control of stimulants, plugging materials and injection fluids in producing formations in wells. In this regard, in many of the oil and gas reservoirs, the permeability and porosity of the formations vary greatly and oftentimes the productive formations, both sand and limestone, are separated by non-permeable barriers, such as shale, sand shale, and the like, varying in thickness. Moreover, the lower portions of the oil and gas bearing formations may be saturated with water and the upper part of some oil bearing formations have gas caps.

Formation stimulants are designed to dissolve the aforesaid formations, to fracture a formation hydraulically, and/or to blast the formation with nitroglycerin, and there have been numerous techniques and procedures attempting to control such formation stimulants, most of which are not considered reliable. Actually, any selective repairing of a portion of the formation is not presently attempted, but, instead, the procedure is to subject the entire formation to the plugging material, placing such in danger of affecting over-all oil or gas productivity.

On the other hand, in the known procedure of water flooding by the introduction of gas or water into spaced wells drilled to the same formation as the producing well and forcing oil to the producing well for recovery, another difficulty arises where the water or gas escapes through a highly permeable section of formation or through a foreign formation, representing a loss without any benefit of increased production. In this regard, much work has been done heretofore in an attempt to determine where channeling is taking place, much of which has proven unreliable at this time.

In accordance with the invention, floatable particles, designated herein as a floating packer, are introduced into the well formation in an arrangement where pressure can be applied. In this connection, a conventional packer serves as the pressure barrier, and, typically, the aforesaid floatable particles are introduced through conventional tubing, such conventional packer, and a tail pipe to achieve various end purposes, the tail pipe playing an important part of the invention.

Many end results are possible with the practice of the invention, as, for example, a permeability survey to locate the point of entry of previously treated formation stimulants; to control the use of the formation stimulant into the desired parts of the formation; to determine where the injected fluid is entering the formation of an injection well in water flooding projects and to control the injection water into the desired part of the formation; for selective plugging of the well formation; and, for sand control to permit the production of oil through sand.

A better understanding of the invention will become more apparent from the following description, taken in conjunction with the accompanying drawing, wherein, FIG. 1 is a generally diagrammatic view, mostly in vertical section, of a typical well employing the invention, showing the floatable particles being introduced therein;

FIG. 2 is a view generally similar to that of FIG. 1, but showing the floatable particles in a plugging position; and, FIG. 3 is a view similar to FIGS. 1 and 2, but showing the release of the floatable particles upon contraction of a conventional packer.

For the purposes of promoting an understanding of the principles of the invention, reference will now be made to the embodiment illustrated in the drawing and specific language will be used to described the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, where like components are identified by the same reference numerals, a typical oil well installation is disclosed comprising a casing 12 surrounded by cement or similar material 14, and having a casing shoe 16 disposed proximate the bottom of the casing 12. The installation further includes tubing 19, a conventional packer 21 which surrounds such tubing 19, and a tail pipe 23 extending from the packer 21, all assembled in the usual manner. The tail pipe in this instance importantly serves to define the space for the floating packer, described below.

The floating packer defining part of the invention is a floatable material 25, varying from fine to coarse in substance. In this regard, the floatable material 25 may be a conventional plastic, shells, or, as a matter of fact, any substance which will float and yet pack to provide the desired barrier, as to be discussed.

With particular reference to FIG. 1, and, where, for example, it is desired to plug the well formation in accordance with the invention, the floatable material 25 is transmitted, through a source of surface pressure (not shown), down the tubing 19, through the packer 21, and through the tail pipe 23, the latter having been positioned to the desired depth, until the space between the tail pipe 23 and the formation is filled with the material 25, the packer 21 serving as a physical barrier. Upon release of the surface pressure, any surplus material 25, i.e. below the opening in the tail pipe 23, may flow upwardly through such tail pipe 23, the packer 21, the tubing 19, and from the well.

At this point, and after resuming the surface pressure, the material 25 is pressed into a tight impermeable mass, sealing a portion 27 of the formation immediately below the casing shoe 16. The unsealed portion 29 of the formation, i.e. below portion 27, can then be processed by injection services, such as, for example, acidizing, hydraulic fracturing, squeezing, and/or the injection of water into the formation. It should be understood that the principal area of importance of the invention lies in the selective defining of the portion 29 of the formation for subsequent processing.

FIG. 3 illustrates the release of the floating packer 25, accomplished through the release of the conventional packer 21 to permit space for the material 25 to flow upwardly to the surface. If desired, by circulating fluid through tubing 19, the packer 21 and the tail pipe 23, the material 25 can be caused to move upwardly at a faster rate. It might also be noted that material 25 may be retrieved and re-used for operating efficiency.

The invention provides versatility for various end uses, including, by way of example, the aforesaid relative permeability survey, the control of sand in a sand well, and the eliminating of an undesirable fluid in a lower formation. In making a relative permeability survey, the tail pipe 23 can be lowered by repeated increments until the point of fluid entry is encountered, beginning with a measured amount below the casing shoe 16.

In this regard, the floating packer material 25 is introduced and positioned as discussed above, followed by an injection test. If there is no indication of shut off, the material 25 is released, and the operation repeated with the tail pipe 23 lowered by a desired increment (see the broken lines in FIG. 1). The same procedure is followed until shut off is encountered, and the point of fluid entry is readily known by the depth of the tail pipe 23.

Another approach to a permeability survey employing the invention is with the placement of the tail pipe 23 to a position almost through the formation (the lowest broken line position in FIG. 1), and the addition of calculated quantities of floating packer material 25. In other words, a first calculated volume of material 25 is introduced and positioned as discussed above, and an injection test conducted. If there is no change in the test, another calculated volume of material 25 is introduced and positioned, and the same procedure followed until shut off, and by calculation, the point of fluid entry is determined.

Irrespective of end purposes, the invention provides for the selective plugging of a formation in an effective and positive manner. As should be understood, many uses are possible, and, accordingly, the above description should be considered illustrative and not as limiting the scope of the following claim.

I claim:
1. The method of making a relative permeability survey of a formation in a well containing a liquid which comprises the steps of disposing a tail pipe within the casing of the well, disposing barrier means around said tail pipe in blocking relationship with said casing, introducing material having a specific gravity less than the specific gravity of said liquid in the well within the casing below said barrier means and floating in plugging relationship with a portion of the formation with the lower portion of said material at the lower end of said tail pipe, making an injection test of the unplugged portion of said formation through said tail pipe, lowering said tail pipe a desired increment, and repeating said steps of introducing material and making an injection test.

References Cited

UNITED STATES PATENTS

| | | | |
|---|---|---|---|
| 1,661,270 | 3/1928 | Ryder et al. | 166—10 X |
| 2,207,334 | 7/1940 | Reynolds et al. | 166—19 |
| 3,127,937 | 4/1964 | McGuire et al. | 166—21 X |
| 3,161,235 | 12/1964 | Carr | 166—29 |

STEPHEN J. NOVOSAD, Primary Examiner

IAN A. CALVERT, Assistant Examiner

U.S. Cl. X.R.

73—155; 166—285